(12) United States Patent
Steinert

(10) Patent No.: US 7,679,045 B2
(45) Date of Patent: Mar. 16, 2010

(54) METHOD FOR CORRECTING A CONTROL OF AN OPTICAL SCANNER IN A DEVICE FOR IMAGING A SAMPLE BY SCANNING AND THE DEVICE FOR PERFORMING THE METHOD

(75) Inventor: Joerg Steinert, Jena (DE)

(73) Assignee: Carl Zeiss Microimaging GmbH, Jena (DE)

( * ) Notice: Subject to any disclaimer, the term of this patent is extended or adjusted under 35 U.S.C. 154(b) by 468 days.

(21) Appl. No.: 11/525,210

(22) Filed: Sep. 22, 2006

(65) Prior Publication Data

US 2009/0008539 A1  Jan. 8, 2009

(30) Foreign Application Priority Data

Oct. 1, 2005  (DE) .................. 10 2005 047 200

(51) Int. Cl.
*H01J 3/14* (2006.01)
(52) U.S. Cl. ..................... 250/234; 359/197.1
(58) Field of Classification Search ......... 250/234–236, 250/201.3; 359/197, 199, 212, 213, 368, 359/197.1, 199.1, 212.1, 213.1
See application file for complete search history.

(56) References Cited

U.S. PATENT DOCUMENTS

| | | | |
|---|---|---|---|
| 5,478,997 A | 12/1995 | Bridgelall et al. | |
| 6,037,583 A | 3/2000 | Möhler et al. | |
| 6,677,579 B2* | 1/2004 | Engelhardt | 250/234 |
| 6,850,376 B2 | 2/2005 | Wohlfrom | |
| 6,894,271 B2* | 5/2005 | Widzgowski | 250/234 |

(Continued)

FOREIGN PATENT DOCUMENTS

DE  197 02 752 A1  7/1998

(Continued)

*Primary Examiner*—Kevin Pyo
(74) *Attorney, Agent, or Firm*—Jacobson Holman PLLC

(57) ABSTRACT

Method for correcting control of an optical scanner in a laser scanning microscope for imaging of a sample by scanning, the microscope guiding at least one beam path section of an illumination beam path of the microscope over the sample from an illumination device to the sample and/or an imaging beam path of the microscope from the sample to an acquisition device of the microscope in order to obtain an image of the sample, generating control signals corresponding to a predefined target movement using parameters and/or a transfer function of the scanner that are used for control and/or regulation and moving the at least one beam path section in response to the control signals, whereby an image of a reference sample having predefined structures imageable by the microscope is obtained by generating control signals corresponding to a predefined target test movement and moving the at least one beam path section in response to the control signals, thereby obtaining the image. From the image thereby obtained, a deviation in the actual positions of the predefined structures of the reference sample from the predefined target positions is determined and the transfer function or parameters are corrected as a function of the deviations at least one of the parameters used for control and/or regulation, so that when using the corrected parameter for control or regulation and/or when using the corrected transfer function, the deviation in the actual position of at least one of the structures from the target position of the structure is reduced.

23 Claims, 6 Drawing Sheets

U.S. PATENT DOCUMENTS

Figure 1:
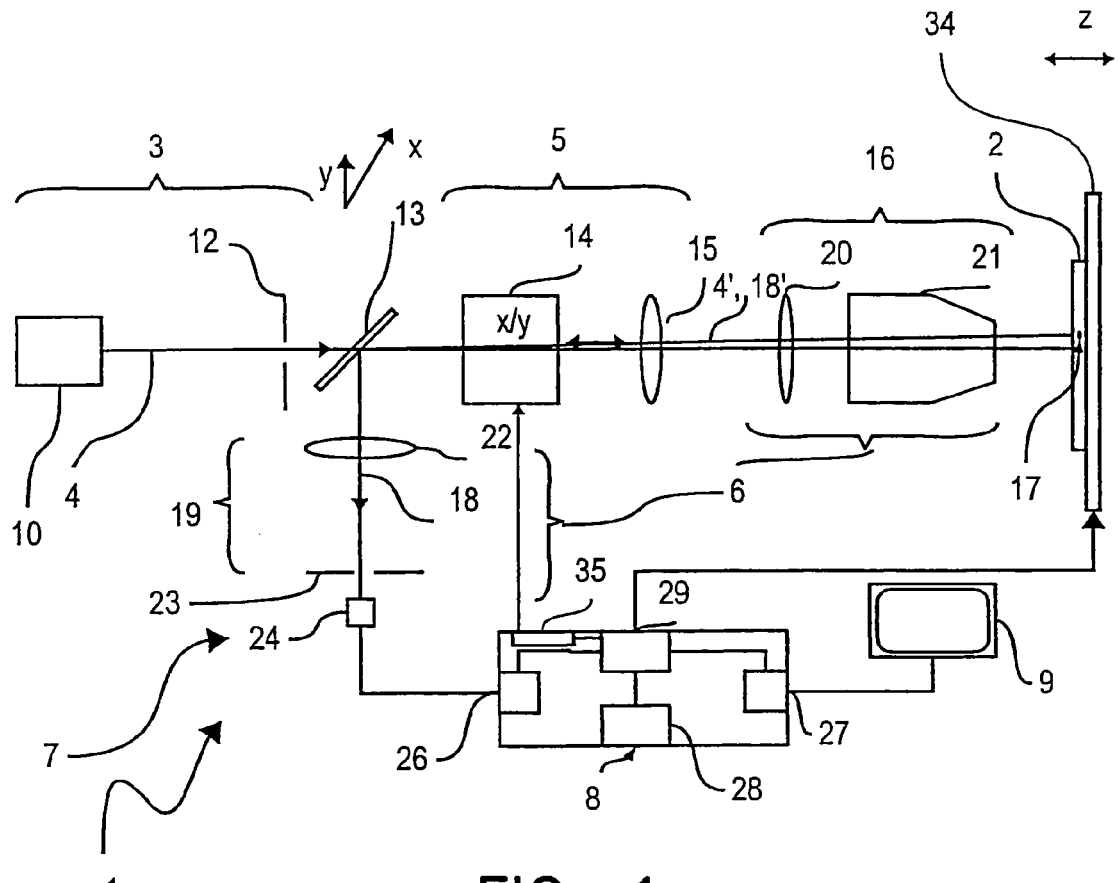

| | | | |
|---|---|---|---|
| 6,914,238 B2* | 7/2005 | Engelhardt et al. | 250/234 |
| 6,927,902 B2* | 8/2005 | Schoeppe | 359/368 |
| 2002/0198457 A1 | 12/2002 | Tearney et al. | |
| 2007/0086048 A1* | 4/2007 | Steinert et al. | 358/1.15 |

FOREIGN PATENT DOCUMENTS

| | | |
|---|---|---|
| DE | 102 37 384 A1 | 3/2004 |

\* cited by examiner

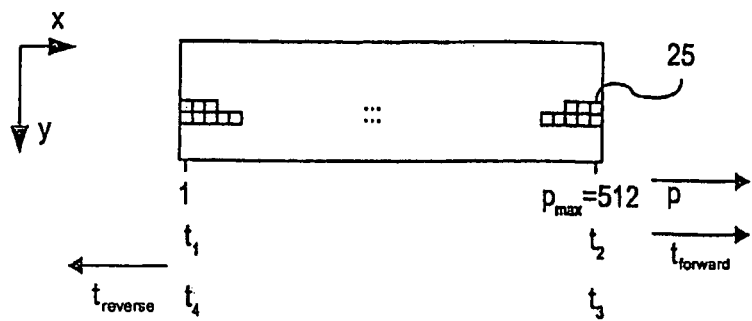
Fig. 6
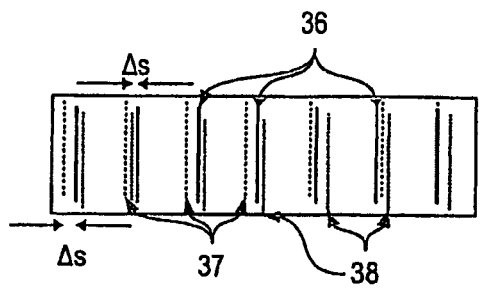
Fig. 7
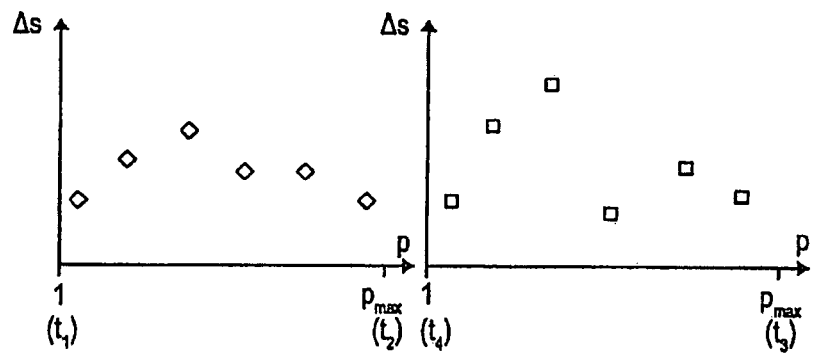
Fig. 8a
Fig. 8b
Fig. 9

METHOD FOR CORRECTING A CONTROL OF AN OPTICAL SCANNER IN A DEVICE FOR IMAGING A SAMPLE BY SCANNING AND THE DEVICE FOR PERFORMING THE METHOD

The present invention relates to methods for correcting a control of an optical scanner in a device for imaging a sample by scanning and devices for performing the method.

Laser scanning microscopes are an important example of devices for imaging a sample by scanning. With these microscopes, a sample is usually scanned with a laser beam focused in a point on a layer of the sample, whereby the focus is confocally imaged on an acquisition unit. For deflection of the laser beam to a predefined position of the sample and for deflection of the detection radiation emitted from the focus onto the acquisition unit, a deflection device is used which is also referred to as a scanner and allows controlled deflection of the laser beam and/or the detection radiation. For acquisition of an image of a layer of the sample, the laser beam and/or its focus is passed line by line over a sample from a first end position into a second end position and then back again, whereby in each of the end positions, the beam is deflected in a direction orthogonal to the direction of movement in the line, so that the focus jumps to the next line. The focus is then moved in the line in the most linear and most uniform pattern possible, so that by acquisition of the detection radiation in constant intervals of time from equidistant locations arranged in the manner of a matrix in the layer of the sample, a pixel representation of the image is obtained, with the pixels, which are then also arranged in the form of a matrix, being assigned to the locations. An undistorted image is therefore obtained only when the movement of the focus corresponds exactly to a uniform linear movement.

To achieve a high precision, the position of the drive and/or mirror of the scanner can be detected in the form of a check-back signal by means of a position sensor, as described in DE 197 02 752 C2, for example, whereby deviations from a target position are corrected on the basis of this signal. However, this procedure is not accurate enough for high scanning speeds. Electronic processing of the check-back signal and detection signal leads to distortion in the signals and to phase differences between the signals. In addition, due to deformation in the scanner wave which transmits the drive movement to the mirror, and deformations of the scanner mirror itself, the acknowledged position does not correspond to the actual position of the mirror.

It is therefore conceivable to perform an optical calibration of the scanner, whereby the control of the scanner is adjusted so that the actual movement of the focus corresponds to the target movement as accurately as possible. Although the methods known in the past, such as those described in DE 197 02 752 C2, for example, allow a good correspondence of the pixel positions at low scanning speeds, i.e., the positions of pixels of the image obtained, with predefined target positions, at higher scanning speeds, they lead to definite image distortion and/or definite deviations between the back-and-forth movement of the focus because of poor linearity in the image.

Due to the distortion in the control signal for the drive of the scanner due to scanner electronics, definite deviations also occur between the predefined movement and the movement actually performed in the case of scanning movements defined freely by the user. This may result, for example, in the fact that a path for the focus, as shown in a survey image, is to some extent situated definitely to the side of the actual path of the focus.

The object of the present invention is therefore to create a method for correcting the control of an optical scanner in a device for imaging a sample by scanning and a corresponding device with an optical scanner to permit accurate control of the scanner.

This object is achieved by a method for correcting the control of an optical scanner in a device for imaging a sample by scanning, which to acquire an image of the sample, guides at least one beam path section of an illumination beam path of the device from a radiation source to the sample and/or an imaging beam path of the device from the sample to an acquisition device, in particular at least one detection element, and which therefore generates control signals according to a predefined target movement using parameters for control and/or regulation and/or using a transfer function of the scanner and moving at least one beam path section in response to the control signals. In this method, an image of a reference sample with predefined structures imageable by the device is detected by means of the device by generating control signals corresponding to a predefined target test movement and moving at least one beam path section in response to the control signals and detecting the image. From the image thereby detected, a deviation of the actual positions of the predefined structures of the reference sample from predefined target positions is determined, and at least one of the parameters used for control and/or regulation or the transfer function is corrected as a function of the deviations, so that when using the corrected parameter for control or regulation and/or when using the corrected transfer function, the deviation of the actual position of at least one of the structures from the target position of the structure is reduced.

This object is also achieved by a device for generating an image of a sample by scanning the sample, in particular a laser scanning microscope with at least one acquisition device for obtaining detection radiation from the sample, said radiation propagating along an imaging beam path from the sample to the acquisition device and emitting detection signals, and an optical scanner arranged in an illumination beam path from an illumination device to the sample and/or in the imaging beam path of the device, comprising a beam deflecting element that is movable in relation to the device and a drive for controlled movement of the beam deflecting element in response to control signals and the control unit that generates control signals for triggering the drive. The control device is designed so that it generates control signals for acquisition of an image of the sample according to a predefined target movement using a transfer function of the scanner and/or parameters for control and/or regulation, so that the drive moves the beam deflecting element in response to these control signals, so that at least one beam path section of an illumination beam path of the device is guided over the sample along a path of movement from a radiation source to the sample and/or an imaging beam path of the device from the sample to the acquisition device, whereby at least parts of an image of the sample are detected by means of the detection device. The control unit also has an input for detection signals of the acquisition device. The device is also designed so that for correcting the control of the scanner, the device detects an image of a predefined reference sample with predefined structures imageable by the device by the fact that the control device generates control signals corresponding to a predefined target test movement and the drive moves at least one beam path section in response to the control signals, and the acquisition device thereby obtains the image, and the control device ascertains from the image obtained a deviation in the actual positions of the predefined structures of the reference sample from predefined target positions and, depending on the deviations, at least one of the parameters used for control and/or regulation or the transfer function is corrected, so that when using the corrected parameter for control or regulation or when using the corrected transfer function, the deviation in the actual position of at least one of the structures from the target position of the structure is reduced.

The term target movement is understood to refer to a movement along a path, but it is also possible for a movement in another direction that does not have any components in the direction of the path to be superimposed thereon. In the case of a laser scanning microscope with a point focus on the sample, the movement along a line may constitute the target movement, in which case the slower movement in the direction orthogonal to the line need not be taken into account. However, the method may of course also be applied to this movement.

Depending on the design of the scanner, the target movement may be predefined by the fact that the target position of the deflected, i.e., moved beam path section is predefined. However, it is also possible for the target movement to be predefined by specifying a target movement of the focus of the beam path in a focal plane.

With the method and the device, a target test movement is used which is predefined. This need not necessarily match the target movements of the part of the beam path moved by the scanner and thus the focus in or on the sample, but this is preferably the case.

The term scanner here is understood to refer to any deflection device which has controlled deflection of a beam of optical radiation in a wavelength range suitable for the scanner. In particular, the scanner may comprise a beam deflecting element, e.g., a mirror or a prism, a drive controllable by control signals for moving the beam deflecting element and a control unit for generating the control signals. Fundamentally, the scanner need allow movement in only one direction, but other components may of course also be provided, permitting a deflection of another direction in addition.

The scanner may fulfill the same different functions in the device, depending on the design thereof. Thus, in the case of a device in which only one illumination beam is guided over the sample in a directed or focused manner, the scanner may be arranged in the illumination beam path between the sample and an illumination source for optical radiation, so that the section of the illumination beam path between the scanner and sample is movable by the scanner, preferably being pivotable. The illumination focus is thus also moved accordingly. With a device with which only detection radiation from various areas of the sample is deflected by the scanner onto the acquisition device and/or a detection element of the acquisition device, the scanner is arranged in the detection beam path between the sample and the acquisition device in such a way that the scanner moves the section of the detection beam path between the sample and the scanner. The acquisition device need be designed only for detection of the detection radiation emitted by the sample and therefore may also be referred to as a radiation detection device. This detection device may in the simplest case be a single detection element for detection radiation emitted by a sample.

With devices such as a laser scanning microscope with which both a section of the illumination beam path and a section of the detection beam path are pivoted, the scanner may preferably be situated in both beam paths so that it guides the section of the illumination beam path over the sample, i.e., scans it, and at the same time "descans" the detection radiation, i.e., moves the section of the detection beam path that is movable by the scanner in accordance with the movement of the section of the illumination beam path.

For control and/or regulation of the scanner, at least one parameter is used. This parameter may be, for example, a parameter that describes the target movement of the movable beam path section and/or the focus on the sample. However, other parameters may also be used here for control or regulation. In addition, this may also be understood to include parameters that modify a signal of a sensor used for regulation.

The term transfer function, which is sometimes also referred to as frequency response, may be understood to refer to any transfer function for a section of the scanner which links the input quantities with the output quantities of that section. In particular, this may be an optical transfer function which indicates how control signals, which are generated from a target movement of the part of the beam path and/or focus that is movable by the scanner as an input quantity without any possible predistortion, or a target movement as part of the beam path and/or focus movable by the scanner as the input quantity without possible predistortion are linked to the actual movement of the beam path and/or focus.

The transfer function may be defined, for example, by a complex function of the frequency in the case of a representation in a Fourier or Laplace space. As those skilled in the art are aware, at least in the case of the Fourier representation, the transfer function may have two components in an equivalent real representation, these two components being based on amplitudes of sine and cosine frequency components or amplitude and phase.

For correction, the reference sample is used; it has at least two structures detectable by the device, their position in relation to one another being presupposed as known. A reference sample with periodic structures in the direction of the target test movement is preferably used because this is easier to analyze. In particular, areas with increased or reduced absorption or reflectivity in comparison with the environment of the structures may be used as the structures. In the case of a confocal laser scanning microscope, however, geometric structures such as webs or recesses and/or furrows may also be used if the reference sample has optical properties differing from those of the medium surrounding the reference sample, in the area of the optical radiation that is used and/or detectable by the device, in particular a laser scanning microscope.

Using the scanner, an image of the sample is detected for the correction. To do so, the section of the beam path that is movable by the scanner is guided over the reference sample in accordance with the target test movement. Then a complete image of the reference sample can be detected, but it is sufficient in principle to detect a section of the sample that has the structures.

For the correction, the actual positions of the structures in the image thereby detected are compared with the target positions by ascertaining deviations between these positions. Image and/or pattern recognition methods such as those known from image processing, for example, may optionally be used for detection of the structures prior to ascertaining the actual positions, especially with complex structures.

On the basis of the deviations, the correction of the parameter and/or the transfer function is determined, so that when using the corrected parameter, the deviation between the target position and the actual position of at least one of the structures, preferably all the structures detected, is reduced. Such a correction is of course only necessary and possible if such deviations are found after a check on whether there are still deviations that can be reduced according to a predefined accuracy criterion. In the case of a correction of the transfer function with two components, it is fundamentally sufficient for only one of the components to be corrected, but preferably both components are corrected.

The corrected values may then be saved in the device in particular so that they are immediately available in performing a measurement and/or acquisition of a sample.

If initially only a roughly estimated value or characteristic is known as the value of the parameter to be corrected or as the characteristic of the transfer function, at least permitting operation of the device, the correction method may also be understood to include measuring methods for ascertaining the value of the parameter and/or the transfer function.

To perform the method as well as to control the scanner in general, the scanner has the control device which may include a processor in particular which implements the inventive method in execution of instructions of a computer program stored in the device. The control device may fundamentally be separate from a control and analyzer unit of the device. To advantageously avoid a complicated design, however, preferably at least parts of the control device may be formed by the control and analyzer unit.

Therefore, the subject matter of the invention is also a computer program having instructions which perform the inventive method when executed by a processor.

In addition, the subject matter of the invention is also a memory medium, in particular a data medium such as optical, magnetic or magneto-optical data media or nonvolatile memories such as EEPROMs or flash memories on which a computer program with instructions is stored, such that when it is executed, a processor of the control unit of the device according to this invention performs the inventive method.

The invention has a number of advantages. After application of the inventive method, the drive of the scanner can be triggered with control signals which represent a target movement very well. This permits a very accurate guidance of the section of the beam path that is movable by the scanner. This avoids possible image distortion caused by deviations in the actual movement from the target movement. In acquisition of an image of a sample using the target movement, an image is obtained that has only very minor deviations or ideally no deviations at all in the detected geometry from the actual geometry of the sample.

Since the scanner now runs precisely in synchronization with the image data acquisition by means of the acquisition device, no software-based equalization of the image after acquisition is necessary.

In the case of a movement of a focus of an illumination laser beam by means of the scanner, the scanner moves the focus over the sample at a constant and very precise speed in the case of a uniform linear target movement, so there are little or no fluctuations in the load on the sample due to the illumination radiation.

Predefined periodic target movements and/or scanning curves of any form, in particular a form that is freely preselectable by the user, can be executed at high speed because optimum predistortion of the control signals of the scanner can be calculated during operation, i.e., online, on the basis of an optically measured transfer function. It is therefore possible to ensure in particular that a curve predefined by a user on the basis of an overview image generated by the device is reproduced very accurately.

It is fundamentally sufficient for the target test movement to take place in only one direction of movement. However, it is preferable that in the case of this method, the target test movement in a forward movement should take place from a predefined first end position to a predefined second position and in a reverse movement it should take place from the second end position along at least one section of the path of the forward movement. With this device, it is preferably here for the control unit to be designed so that the target test movement in the case of a forward movement takes place from a predefined first end position to a predefined second end position and in the case of a return movement the target test movement is from the second end position along at least one section of the path of the forward movement. This embodiment has the advantage that with a corresponding correction, there are no deviations or at any rate there are only very minor deviations between the forward and reverse movements of the section of the beam path that is movable by the scanner. In other words, a location in the direction of movement in or on the sample which was detected in the forward movement is also detected in the reverse movement. This means that in the case of line-by-line scanning of a sample, pixels situated in the same pixel position in successive lines will also correspond to the locations at the same point in the line in the image in successive lines. Although it is fundamentally sufficient for only a portion of the path that is covered in the forward movement to also be covered in the reverse movement, the reverse movement is preferably continued to the first end position, so that the movement is cyclic and, with repeated execution, is also periodic. Therefore, a larger volume of data is available for ascertaining the correction, so that its precision can be increased over the entire range utilized.

Essentially image data may be obtained during the entire target test movement. Typically, however, accelerated phases occur during a target movement and in particular during a target test movement; during these accelerated phases the direction of movement is reversed, e.g., in the case of a periodic movement. In these ranges, however, a precise correspondence between the target position and actual position is not absolutely necessary because these ranges are not utilized even in use of the device for analyzing specimens. In this method, image data are therefore preferably obtained only in an effective range which is less than twice the predefined amplitude of the target test movement. With this device, image data are preferably obtained only in an effective range which is less than twice the predefined amplitude of the target test movement. This embodiment has the advantage that a correction takes place only in the range used for image acquisition and therefore the correction proceeds more rapidly. In addition, a greater accuracy can be achieved because a precise adjustment outside of the effective range is not necessary.

Essentially in this method the target positions of the predefined structures can be quantitatively predefined. Preferably however, in the method for ascertaining the target positions of at least two of the predefined structures, the actual positions of at least one of the predefined structures of the reference sample are determined in the back-and-forth movement and the target positions of at least two of the predefined structures are determined by using the actual positions and predefined relative positions of the predefined structures of the reference sample. With this device, the control unit is preferably designed so that it ascertains the actual positions of at least two of the predefined structure of the reference sample in the back-and-forth movement for the acquisition of the target positions of at least two of the predefined structures, and the target positions of at least two of the predefined structures are determined using the actual positions and predefined relative positions of the predefined structures of the reference sample. This embodiment offers the advantage that the reference sample need not be positioned accurately in relation to the scanner, which would otherwise require a considerable adjustment complexity. The correction may thus be performed more easily and more rapidly. This target positions that are determined are then advantageously stored in the device.

In a preferred embodiment of the method, the target test movement is a uniform linear movement in at least some sections in the acquisition range and intensities are determined at constant intervals of time in both the back-and-forth movements and assigned to pixels corresponding to locations on the reference sample. To ascertain the deviations, the deviations for pixels with the same location along the target movement path are determined in both the forward and reverse directions and the deviations are determined pixel by pixel, i.e., they are assigned to the pixels one measurement point at a time and are separated for the back-and-forth movements. To ascertain the deviations as a function of time, the deviations assigned to the pixels are reversed in their order for one back-and-forth movement and placed before or after a train of the deviations assigned to the pixels for the other back-and-forth movement. With this device, it is preferably here for the control unit to be designed so that the target test movement is a movement that is uniform and linear in at least some sections in the detection range, detecting intensities in constant intervals of time in both the back-and-forth movements and are assigned to pixels corresponding to locations on the reference sample such that for ascertaining the deviations, the deviations are determined for pixels with the same location along the target movement path in both the forward and reverse directions and the deviations are determined pixel by pixel, separately for the back-and-forth movements, and to ascertain the deviations as a function of time, the deviations assigned to the pixels for one of the back-and-forth movements are reversed in order and placed in front of or behind a train of deviations assigned to the pixels for the other back-and-forth movement. This embodiment has the advantage, first of all, for acquisition of the image, the method otherwise used for acquisition of images may be used, in which acquisition of images takes place only in an organized manner according to pixels and thus no corresponding changes in the device are necessary merely for the purpose of correction, but on the other hand, a simple acquisition of the deviations from a target test movement, which is predefined as a function of time, is possible. If the reference sample is scanned line-by-line, for example, whereby the target test movement is along the line and there is a movement orthogonally to that at the reversal points, this means that deviations are determined for pixels with the same location along the target movement path, but such pixels that have the same position in the line do not necessarily have the same position orthogonally to the line.

The target movements and in particular the target test movement may fundamentally be performed in any desired manner. With this method, however, the target test movement is preferably defined by superimposing frequency components and a cross-correlation of the actual movement or the deviations determined with a harmonic function corresponding to the frequency component is determined for the acquisition of at least one of the frequency components of the actual movement. With this device the control unit is preferably designed so that the target test movement is defined by superimposing frequency components and the control unit for ascertaining at least one of the frequency components of the actual movement ascertains a cross-correlation of the actual movement or the deviations thereby determined with a harmonic function corresponding to the frequency component. The representation by means of frequency components may be performed for example by Laplace transformations or preferably by Fourier series and/or approximately Fourier sums. In the case of using Fourier sums in particular, this embodiment offers the advantage that the frequency components of the deviation can be determined easily and reliably even in the case of non-equidistant interpolation points and/or gaps in the time function although, for example, a fast Fourier transform cannot be readily used.

Essentially any suitable parameters may be used as the parameters for control or regulation. In this method, however, amplitudes and/or phases of frequency components are preferably corrected for use as the parameters for control; prior to the correction, these amplitudes and/or phases reproduce the predefined target test movement when superimposed. With this device, the control is therefore designed so that amplitudes and/or phases of frequency components are corrected for use as the parameter for control purposes, these amplitudes and/or phases reproducing the predefined target test movement when superimposed prior to the correction. This embodiment has the advantage that only very minor intervention into the control of the scanner is necessary. In particular, instead of the uncorrected frequency components, only the corrected frequency components need be stored in the device.

Alternatively, the transfer function may be corrected. This is possible in the same way as with the movement parameters if the correction is performed by a factor which is multiplied times the corresponding frequency component of the transfer function instead of being multiplied times the parameter. In this method however it is preferable for the target test movement to be predefined by these descriptive frequency components for correction of the transfer function, the control signals are formed by superimposing the frequency components, at least one of the frequency components is modified after the deviations are determined and revised control signals are formed by superimposing the frequency components thereby obtained, another image of the reference sample with predefined structures imageable by the device being detected by the device by generating control signals corresponding to a predefined target test movement and at least one beam path section is moved in response to the control signals, thereby also obtaining the additional image; additional deviations in the actual positions of the predefined structures of the reference sample from predefined target positions are determined from the additional image thereby obtained; and a value of the transfer function is determined from the deviations and the additional deviations and the change in the frequency component. With this device it is therefore preferable for the control unit to be designed so that for correction of the transfer function the target test movement is predefined by this descriptive frequency component; the control signals are formed by superimposing the frequency components; after ascertaining the deviations at least one of the frequency components is modified and the control signals modified by superimposing the resulting frequency components are formed; another image of the reference sample having predefined structures imageable by the device is determined by means of the device by generating control signals corresponding to a predefined target test movement and at least one beam path section is moved in response to the control signals and in doing so the additional image is obtained, additional deviations in the actual positions of the predefined structures of the reference sample from predefined target positions being determined from the additional image obtained and a value of the transfer function being determined from the deviations and the additional deviations and the change in the frequency component. This embodiment has the advantage that the transfer function can be measured directly via its definition.

If in controlling the scanner a check-back signal of a position sensor that detects the position of the drive is used for position regulation, then in another alternative, a correction factor may also be used as a parameter for the position signal of the position sensor.

The reference sample may be prepared in a different way. According to one alternative, it is brought by a user like a sample to be analyzed into the imaging beam path, e.g., on a microscope stage.

According to another preferred embodiment, the reference sample is fixedly connected to the device. This has the advantage that the user need not handle the reference sample and the correction can be triggered easily by operating a corresponding operating element, e.g., provided by a graphical user interface. Thus, for example, it is conceivable to integrate the reference sample into the microscope stage.

The device especially preferably has a reference optic for imaging the reference sample on the acquisition device. In this method it is preferable for the reference sample to be fixedly connected to the device and for at least a portion of the moving beam path section to be deflected onto a reference optic of the device for imaging the reference sample onto the acquisition device for acquisition of the image of the reference sample. To do so in particular a beam deflecting element, e.g., a mirror may be provided which can be moved into the imaging beam path provided for examination of normal samples so as to direct the beam path section moved by the scanner onto the reference optic and/or the reference sample. The movement of the beam deflecting element may be accomplished manually or by means of a drive of the device.

The corrections determined may be used in particular to correct the check-back signals in the case of a device having a position sensor for acquisition of a position of a drive of the scanner and delivery of corresponding check-back signals, so that these check-back signals reproduce the actual movement of the section of the beam path movable by the scanner. Therefore, the subject matter of the invention is also a method for correcting check-back signals of a position sensor of a device for generating an image of a sample by scanning the sample, in particular a laser scanning microscope with which an optical scanner deflects a section of a beam path of the device in a controlled manner and to this end has a drive and a movable beam deflecting element driven by the drive, whereby the position sensor detects the position of the drive and/or the beam deflecting element and generates a position signal that reproduces the position, and in which the position signal is corrected, preferably using a corrected transfer function or a corrected parameter for control or regulation of the scanner, said parameter or transfer function having been determined by means of a method as described above for correction of the scanner control, so that it reflects the actual movement of the beam path section moved by the scanner. The subject matter of the invention is also a device for generating an image of a sample by scanning the sample, in particular a laser scanning microscope, wherein an optical scanner deflects a section of the beam path of the device in a controlled manner and to do so has a drive and a movable beam deflecting element drive by the drive, wherein the position sensor detects the position of the drive and/or the position of the beam deflecting element and generates a position signal reflecting said position, and wherein the position signal is corrected so that it reflects the actual movement of the beam path section moved by the scanner. For the correction, the position signal may preferably be broken down into frequency components, whereby each component yields the optical transfer function according to a transfer function that reflects the response of the drive to a control signal by linkage of a known electric transfer function.

The optical transfer function is preferably determined with the correction method for the transfer function. In addition the device is preferably a device according to this invention as defined above.

This method and the corresponding device have the advantage that a movement, which is indicated on the basis of the corrected check-back signals, of the beam path section movable by the scanner and/or the focus of the beam path section reflects in very good approximation the actual movement of the focus.

This invention may be used in particular for confocal laser scanning microscopes.

Figure 4:
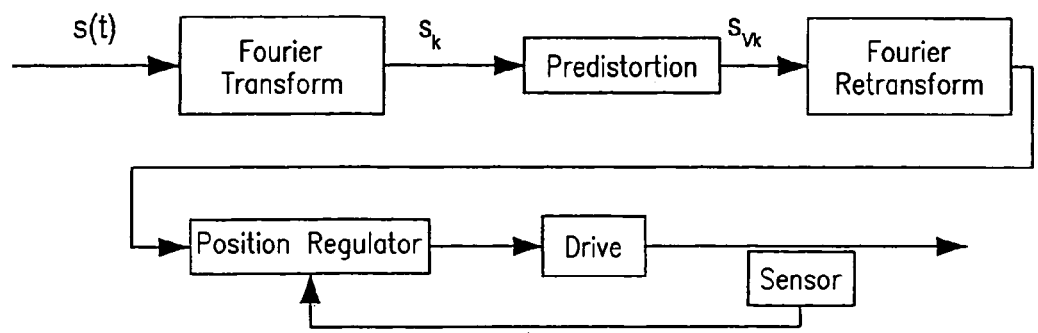
Figure 2:
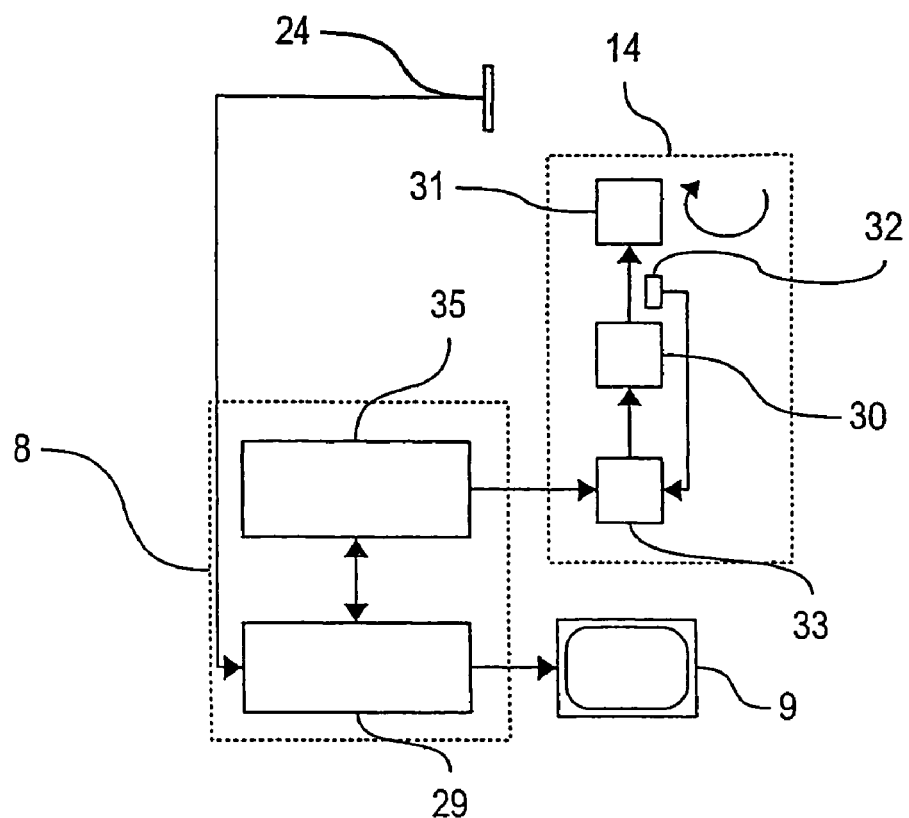
Figure 3:
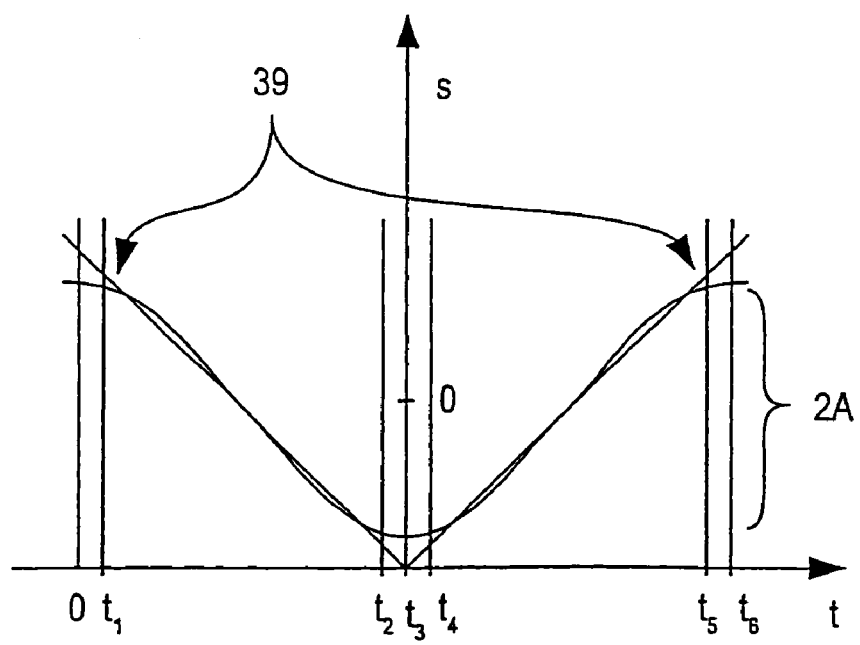
Figure 5:
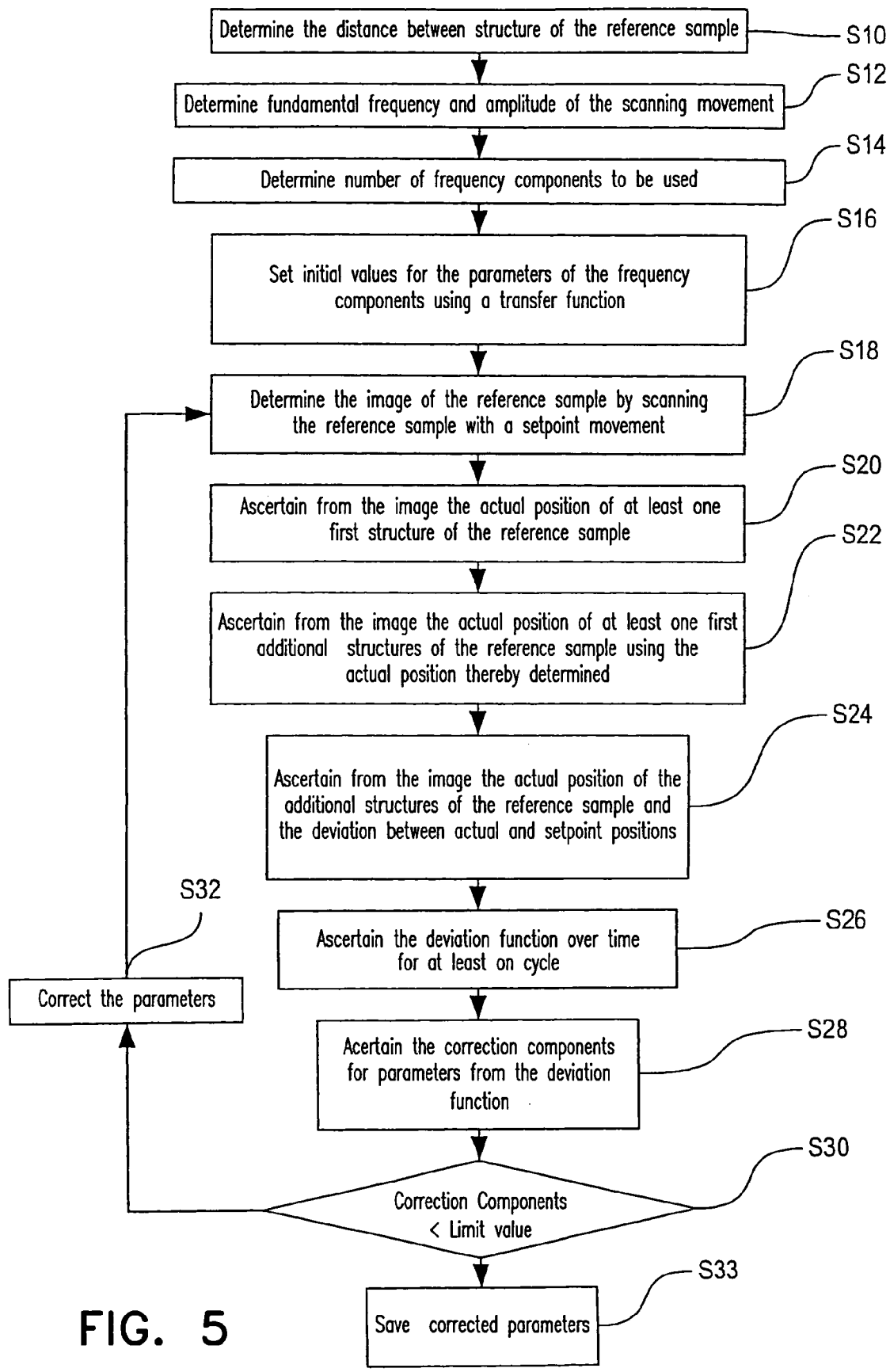
Figure 10:
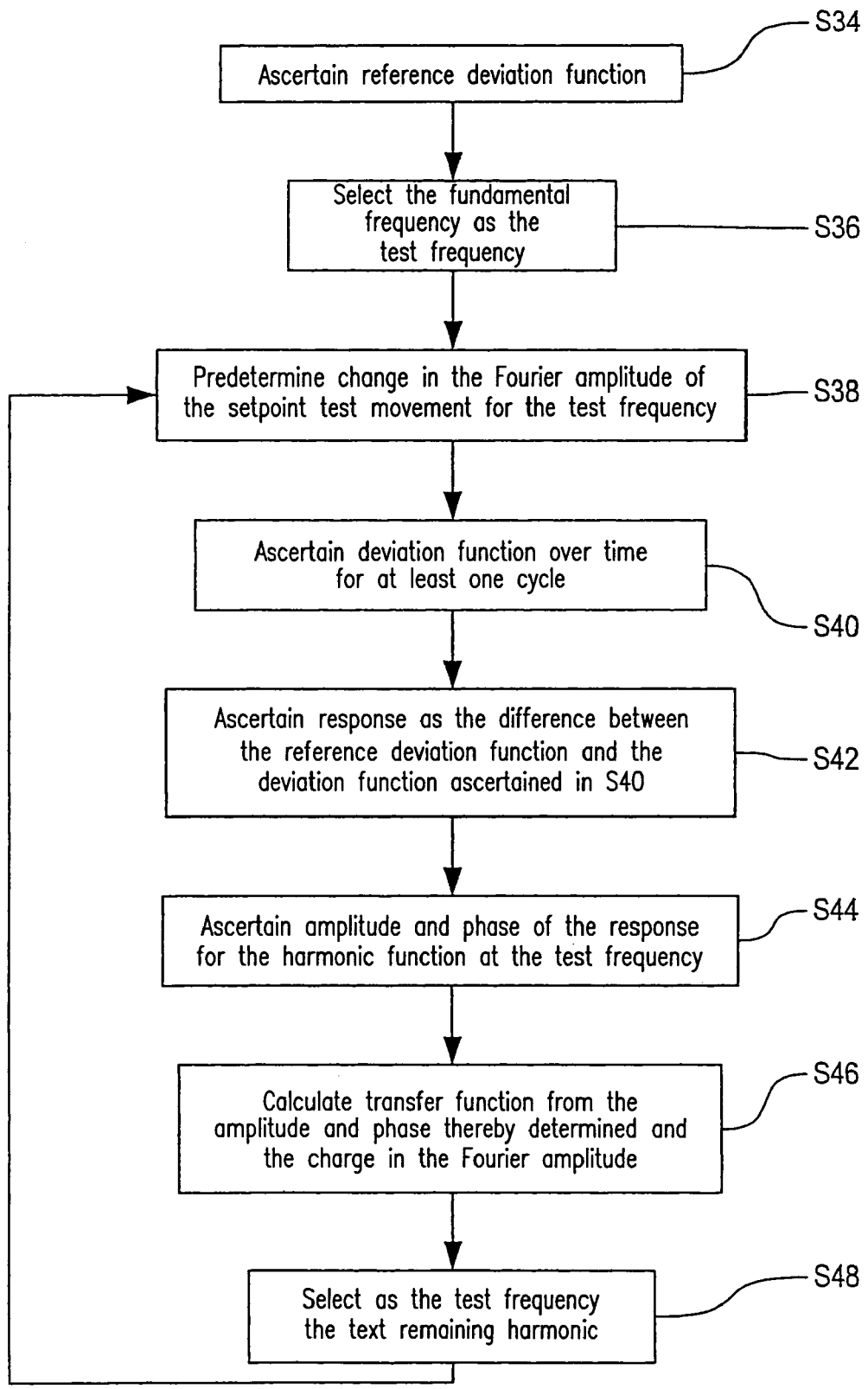
Figure 11:
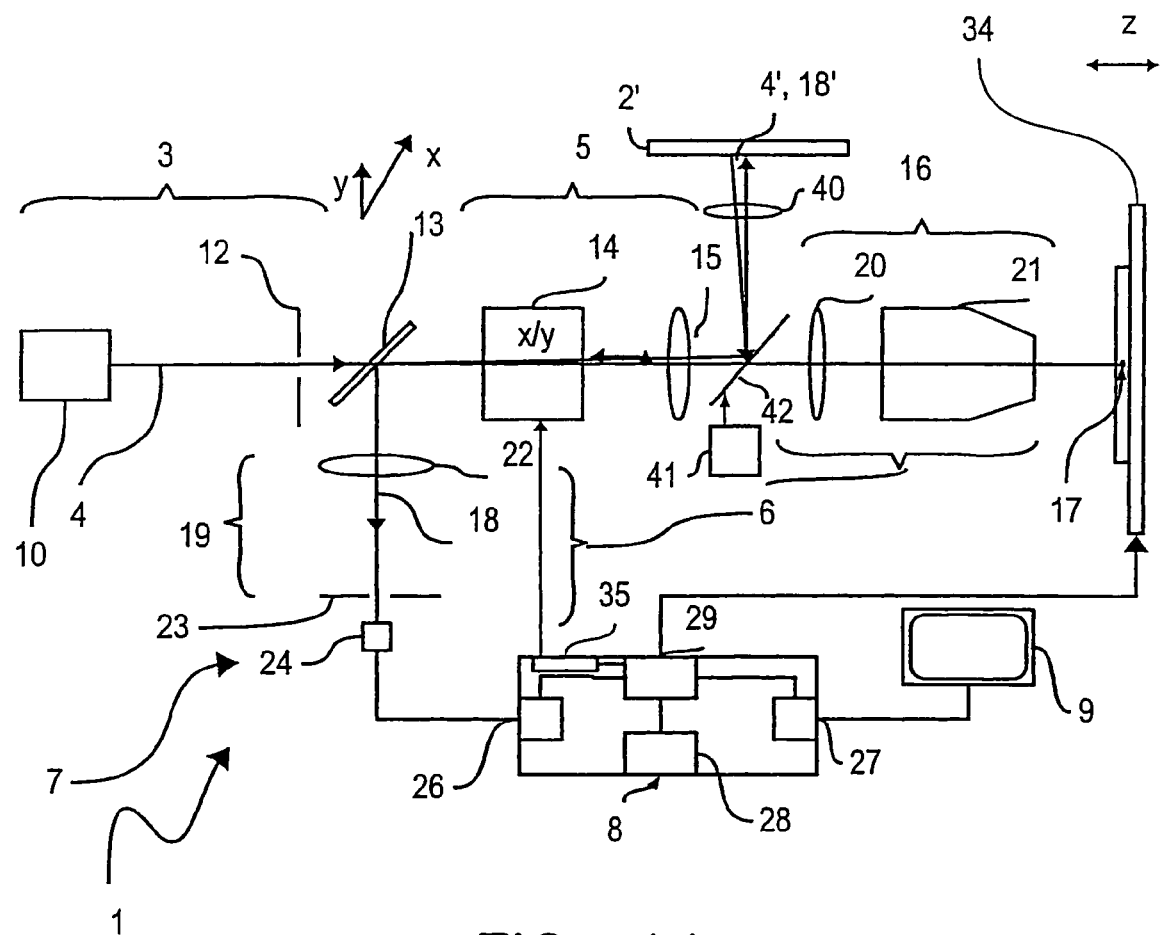

This invention is explained in further detail below as an example on the basis of the drawings, which show:

FIG. 1 a schematic diagram of a laser scanning microscope,

FIG. 2 a schematic block diagram of components of the laser scanning microscope in FIG. 1 that are relevant for an optical scanner of the laser scanning microscope, FIG. 3 a simplified distance-time diagram for a target movement and an approximate target movement, FIG. 4 a block diagram for generating control signals for a drive of the scanner in FIG. 2, FIG. 5 a simplified flow chart for a method for correcting the control of the scanner in FIG. 2, FIG. 6 shows a schematic diagram of a pixel structure of an image obtained with the laser scanning microscope in FIG. 1, FIG. 7 a schematic diagram of a test sample with target positions of linear structures and actual positions of the linear structures in a back-and-forth movement, FIGS. 8a, b diagrams in which deviations between target positions and actual positions of linear structures are plotted as a function of the pixel number for the back-and-forth movements, FIG. 9 a diagram in which the deviations in FIGS. 8a and 8b are plotted as a function of time, FIG. 10 a simplified flow chart for a method for correcting an optical transfer function and FIG. 11 a schematic diagram of a laser scanning microscope according to another preferred embodiment of the invention.

In FIG. 1, a device which is shown only with great simplification for generating a scan image according to a first preferred embodiment of the invention in the form of a laser scanning microscope 1 that is used for examining an object and/or a specimen 2 has an illumination section 3 for emitting a collimated illumination beam 4, a deflection section 5 for controlled deflection of the illumination beam 4, an imaging lens and/or microscope optics 6 and an acquisition device 7 for obtaining recorded image data for at least partial images of the object 2 which are imaged by the imaging lens 6 on the acquisition device 7. A control and analyzer unit 8 is connected to the acquisition device 7 and a display device 9 in the form of a color monitor.

With this laser scanning microscope 1, the sample 2 is imaged by scanning it with the illumination beam 4 with a cross section that is almost point-shaped in a layer of the sample 2 that is to be imaged.

The illumination section 3 serves to emit the collimated illumination beam 4 with a predefined beam profile and therefore has a source 10 for optical radiation, namely a laser in the present example, along an illumination beam path and has a fine aperture 12 (pinhole aperture) in a conjugated plane with the position of the focus of the illumination beam 4 on the sample 2.

The illumination beam 4 emitted from the illumination section 3 passes through a beam splitter 13 into the deflection section 5 for controlled deflection of the illumination beam 4 passing through the beam splitter 13. The deflection section 5 therefore has a deflecting device that is connected to the control and analyzer unit 8 for triggering and/or has an optical scanner 14 and scan optics 15.

The scanner 14 is designed to pivot the illumination beam 4 in a plane orthogonal to the direction of the illumination beam 4 upstream from the deflection device, i.e., orthogonal to the plane of the drawing in FIG. 1. It therefore has two drives that can be triggered by the control and analyzer unit 8 via control signals independently of one another, only the drive 30 for movements in the x-direction being shown in FIG. 2, and has two beam deflecting elements, namely mirrors here, each being pivotable about an axis by means of the drives; of these mirrors, only the mirror 31 driven by the drive 30 is shown in FIG. 2.

In this example, galvanic drives are used. The axes of rotation about which the mirrors can rotate run orthogonally to one another, whereby the mirror 31 deflects the illumination beam 4 in the x-direction in a controlled manner corresponding to the triggering of the drive 30. The other mirror causes a deflection in the y-direction. In addition, a capacitive position sensor for detecting the position of the respective drive and/or the respective mirror and delivering corresponding check-back signals and a position regulating system that is connected to the control and analyzer unit 8 for transmitting control signals and the position sensor are provided for each of the drives; again, only the position sensor 32 and the position regulating system 33 are shown in FIG. 2. In response to a control signal, the position regulating system 33 regulates the position of the drive 30 to a position defined by the control signal, using check-back signals from the position sensor 32, so that this position can be set with a high precision but in a manner that depends on the properties of the position sensor 32.

The deflected illumination beam 4 emerging from the deflection section 5 is focused by the microscope optics 16 in a focus 17 in or on the sample 2. To select the position of the focus 17 in the z-direction, i.e., in the depth of the sample, a specimen stage 34 may be adjusted along the z-direction in an essentially known manner by means of an integrated drive connected to the control and analyzer unit 8 through appropriate signals from the control and analyzer unit 8.

The focus 17, i.e., more specifically, the detection radiation 18 emitted by the focus 17, e.g., fluorescent radiation excited by the illumination beam in the sample 2, is imaged by the imaging lens 6. This includes the magnifying microscope optics 16, the beam splitter 13 and a detection lens 19 that confocally maps the focus 17 onto the detection device 7 along a detection beam path.

The microscope optics 16 include a tube lens 20 and an objective 21.

The beam splitter 13 is designed to allow the illumination beam 4 to pass through at least partially and to deflect the detection beam 18 onto the detection optics 19.

Between the microscope optics 16 and the beam splitter 13 is situated the deflection section 5, which performs the descanning of the detection radiation 18. Descanning is understood to mean that the deflection section is deflected by the focus 17 traveling in or on the sample according to the deflection of the illumination beam 4 of the radiation emitted into a fixed section of the detection beam path, in particular to the beam splitter 13, so the section of the detection beam path between the sample 2 and the deflection section 5 is pivoted between the deflection section 5 and the sample 2 according to the movement of the section of the illumination beam path, but the remainder of the detection beam path remains unchanged.

The scanner 14 thus pivots a beam path section 4' of the illumination beam path and 18' of the detection beam path and/or imaging beam path 18.

The detection radiation 18 from the focus 17, fluorescent radiation excited by the illumination radiation or illumination radiation reflected back from the focus 17 by the sample 2 passes through the microscope lens 16 and the deflection section 5, is deflected by the beam splitter 13 and then goes to the confocal detection lens 19, which consists of a detection lens or lens group 22 and a fine hole aperture, i.e., a pinhole aperture 23. The detection lens and/or lens group 22 is designed and arranged so that detection radiation coming from focus 17 is focused in and passes through the orifice of the pinhole aperture 23, but essentially no other radiation from other areas of the sample 2 is allowed to pass through the pinhole aperture 23. This yields confocal imaging of only one layer of the sample 2 running essentially parallel to the x-y plane with the focus 17. The size of the opening in the pinhole aperture 23 determines the depth resolution of the laser scanning microscope 1 in a known way.

There is optionally a filter (not shown in FIG. 1) for the detection optics 19 behind the pinhole aperture 23, so the filter does not allow unwanted radiation components to pass through or allows them to pass only to a very diminished extent or—in fluorescence tests—the illumination radiation reflected back out of the focus 17 does not pass through at all or only to a very reduced extent.

The detection radiation 18 then goes to the acquisition device 7. The acquisition device 7 has a detection element 24, namely in the example shown, here a photomultiplier on which the focus 17 is imaged and which detects the detection radiation that has passed through the pinhole aperture 23, creating and emitting detection signals.

The acquisition device 7 and especially the detection element 24 are connected by a signal link to the control and analyzer unit 8, which serves to trigger the deflection section 5 and drive the specimen stage 34 and also to analyze the signals of the acquisition device 7, more precisely the image data acquisition signals and/or detection signals of the photomultiplier 24 and to form corresponding images. These images may be displayed with the display device 9, namely a color monitor in the present example, which is connected to the control and analyzer unit 8 via a signal link.

The control and analyzer unit 8 is designed as a data processing unit and has an acquisition interface 26 to the acquisition device 7 and/or its photomultiplier 24, a graphics interface 27 connected to the display device 9, a memory 28 for storing data and instructions of a computer program and a microprocessor 29, which is connected to the interfaces 26 and 27 and to the memory 28 and executes the method described below at least in part in execution of the instructions. Additional instructions of a computer program that allows operation and control of the laser scanning microscope, e.g., by input of a scanning speed and a scanning amplitude via a graphical user interface, is saved in the memory 28 or, more precisely, in a nonvolatile portion of the memory 28. Alternatively, the program could also be saved on a data storage medium like a CD, that could be read via a CD drive (not shown) connected with the microprocessor 19.

In addition, a scan control unit 35 is provided for generating control signals for the optical scanner 14. To this end, the scan control unit 35 may have at least one digital signal processing that has access to a memory (not shown) or an area of the memory 28. This signal processor is triggered by the microprocessor 29.

In other exemplary embodiments, it is possible for the scan control unit 35 to include the microprocessor 29, which is programmed to this end accordingly.

Devices for synchronizing the acquisition of intensities by the photomultiplier 24 with the position of the scanner 14 are also provided in the control and analyzer unit 8, these devices being implemented in part by the microprocessor 29 and also optionally comprising other components (not shown in FIG. 1) with which those skilled in the art are familiar.

Recorded images of a layer in the sample 2, said layer thickness being determined by the size of the opening of the aperture 23 and by the properties of the imaging optics 6, are reproduced by a rectangular arrangement of the image elements, i.e., pixels 25, as indicated schematically in FIG. 6, where the number of pixels has been reduced, however, in comparison with the actual arrangement, for the sake of clarity.

A recorded image of a layer is obtained as follows: the illumination unit 10 emits the illumination beam 4, which is guided over the sample 2 line by line in the x-direction by means of the scanner 14. Detection radiation emitted from there is sent via the microscope optics to the deflection section, where it is descanned. After deflection by the beam splitter, the confocal components are determined by the acquisition device 7 and sent to the control and analyzer unit 8. After the acquisition of a line of pixels is concluded, the movement of the focus is in the y-direction and is superimposed on the movement in the x movement, whereupon the next line in the x-direction can be detected, e.g., with a reversed the direction of movement.

Movement in the x-direction is periodic. The target movement is shown as an example in FIG. 3, where s indicates the position of the focus in x-direction and t is time. The focus ideally moves in the x-direction on its path from a first end position to a second end position and back into the first end position, i.e., periodically, whereby the movement from one end position into the other is uniform and linear, at least in the effective area used for acquisition of an image and has the width 2A in FIG. 3. This movement is characterized by two straight lines 39 in FIG. 3.

However, the focus cannot in fact be accelerated with infinite acceleration from an end position or decelerated with infinite deceleration in approach to the end position. At the start of a period, i.e., starting from a first end point, namely point in time 0 in FIG. 3, there is acceleration first to a desired speed which is reached subsequent at point in time $t_1$. In the next period of time until point in time $t_2$ there is a uniform linear forward movement, during which image data is obtained. Then, in the period of time between $t_2$ and $t_3$, the drive 30 and the mirror 31 and thus the focus 17 are decelerated to the speed 0, which is reached at the second end point. From there, the drive 30 and the mirror 31 are accelerated in the reverse direction until point in time $t_4$ at which the same speed is reached again as in the forward movement. At the same time, by triggering the drive for the movement in the y-direction, in the period of time between $t_2$ and $t_4$, the focus is moved in the y-direction for a predefined period of time and/or by a predefined distance, so that the next line of an image can be obtained in the reverse movement. There is a linear uniform reverse movement in the following period of time $t_5$, during which image data can be obtained again. The drive 30 and the mirror 31 are decelerated again between times $t_5$ and $t_6$, whereby again there is a movement of the focus 17 to the next line in the y-direction. The areas covered between times $t_1$ and $t_2$ or $t_4$ and $t_5$ thus constitute an effective area for image acquisition, where the width 2A is twice the amplitude A of the scanning movement.

Intensities and/or energies of the detection radiation are determined at constant intervals of time by the photomultiplier 24 during the linear uniform back-and-forth movement, the corresponding signals being detected via the interface 26, allocated to the pixels and saved in memory 28 of the control and analyzer unit 8. This means that the number of pixels in a line is defined by the number of points in time when the intensity of the detection radiation is determined. The intensity values determined and assigned to the pixels are saved as a matrix having the elements I(i, p), where the index p indicates the position of the line i. The mutual spacing of the areas depicted by the pixels in the image is obtained as the product of the speed of the focus 17 and the interval of time Δt between the acquisition of successive intensities. Time continues to run in the periodic movement but each location is passed over twice in a period with the movement in the x-direction, so the intensities are saved directly in the control and analyzer unit 8 according to their pixels and thus are assigned to locations. This is illustrated in FIG. 6: for example, intensities are determined for the pixel having the index j=1 nearest the first end position at the points in time $t_1$ and $t_2$, for example, and intensities are determined for the pixel having the index $j=p_{max}$ nearest to the second end position at points in time $t_3$ and $t_4$ in example 512 and the results are saved directly accordingly.

The control signals s corresponding to the target movement $s_{target}$ are generated by a synthesis of frequency components. To do so, first the target movement is represented as a Fourier series with fundamental frequency f corresponding to the period of the x movement. For the triangular movement illustrated in FIG. 3, the following approximate representation is obtained for the deflection $s_{target}(t)$ of the focus 17 through appropriate deflection of the mirror 31 as a function of time t:

$$s_{setpoint}(t) \approx \sum_{k=1}^{N} s_{ksetpoint} \cos(2\pi \cdot k \cdot f \cdot t + \varphi_{ksetpoint})$$

$$= \frac{8}{\pi^2} \sum_{k=1}^{N} \frac{a_{ksetpoint}}{k^2} \cos(2\pi \cdot k \cdot f \cdot t + \varphi_{ksetpoint}),$$

where $s_{ktarget}$ and $a_{ktargett}$ indicate amplitude coefficients and $\varphi_{ktarget}$ indicates phase coefficients for the frequency component with the frequency kf With a larger positive natural number N>1, the Fourier sum representing the target movement is more accurate. In practice, N is selected so that a predefined precision in the representation is achieved. The curve in FIG. 3 represents the Fourier sum for N=1.

Scan control unit 35 generates control signals that are sent to the position regulating system 33. The control signals are preferably generated so that the mobile beam path section and/or the focus 17 executes the target movement in the best possible approximation. Therefore, predistortion is implemented (see FIG. 4), taking into account the influence of all the intermediate components, e.g., the electronic control system, including the drive and mechanical and optical components, such as mirrors, etc. in the form of an optical transfer function. When the Fourier representation of the target movement is used, as described above, the optical transfer function is represented by two components, i.e., an amplitude component $U_A$ and a phase component $U_P$ which depend on frequency. Thus, in a representation of control signals corresponding to a target movement as a Fourier series and/or sum:

$$s(t) \approx \sum_{k=1}^{N} s_k \cos(2\pi \cdot k \cdot f \cdot t + \varphi_k)$$

where Fourier amplitudes $s_k$ and Fourier phases $\phi_k$ are obtained from the corresponding Fourier components of the target movement, and a corresponding representation of the movement of the focus:

$$s_{focus}(t) \approx \sum_{k=1}^{N} s_{focus,k} \cos(2\pi \cdot k \cdot f \cdot t + \varphi_{focus,k})$$

the following equations are used:

$s_{focus,k} = s_k U_A(k \cdot f)$ and $\phi_{focus,k} = \phi_k + U_P(k \cdot f)$, where $U_A(k \cdot f)$ is the amplitude component of the transfer function and $U_P(k \cdot f)$ is the phase component for frequency kf.

For $s_{focus}$ to actually follow the target path, predistortion is calculated as follows:

$s_{V,k} = s_k / U_A(kf)$ and $\phi_{V,k} = \phi_k - U_P(kf)$, and the position regulating system is triggered with control signals according to the Fourier series and/or Fourier sum with predistorted amplitudes $s_{V,k}$ and predistorted phases $\phi_{V,k}$ of the frequency components. The position regulating system 33 and the position sensor 32, the function of which is taken into account in the transfer function, then ensure an accurate triggering of the drive so that the required position is in fact reached (see FIG. 4). With a complete and accurate knowledge of the transfer function, focus 17 will execute the target movement with exactly linear systems.

However, the optical transfer function is known at least theoretically, based on its design, for a laser scanning microscope. The actual transfer function usually differs from the theoretical, e.g., due to ambient influences and drift in the properties of the components, so that an actual movement that deviates from the target movement is obtained by triggering according to a target movement. These deviations can be reduced with the correction method described below according to a first preferred embodiment of the invention.

With this method, a reference sample 2 is used as the sample; it has structures that can be detected with the laser scanning microscope 1. This presupposes that at least the forms of the structures and their positions relative to one another are known. An image of the reference sample is created using a target test movement, from which the actual positions of the structures are determined and after the target positions have been determined, they are compared with the target positions of the structures in the figure. On the basis of the deviations between the target positions and the actual positions, corrections of the parameters used for control or regulation can be determined. In the first exemplary embodiment, the Fourier amplitude and Fourier phases are corrected. In the second exemplary embodiment, the optical transfer function and/or its frequency components are determined.

A sample with a periodic line grid is used in the present exemplary embodiment; its lines 36 are spaced a distance from one another, which is greater than twice the distance of the focus positions on the reference sample 2 in two successive acquisitions of the intensity and/or energy during a movement in the x-direction.

After positioning the reference sample 2 on the specimen stage 34, the control and analyzer unit 8 performs the following method, so the microprocessor 29 and the scan control unit 35, i.e., a digital signal processor contained therein are processing instructions of one or more computer programs saved in the memory 28 in the control and analyzer unit 8.

First in step S10, the control and analyzer unit 8 reads the distance between the lines 36 on the reference sample via a graphical user interface. In other exemplary embodiments, the distance between the lines may also be saved in a nonvolatile part of memory 28; then the value is read out of memory 28.

In the following step S12, the control and analyzer unit 8 likewise obtains the frequency f and the amplitude A of the target scanning movement via the graphical user interface. Frequency f is the fundamental frequency of the Fourier sum to be formed subsequently. In the case when there are already preset scan programs, i.e., combinations of scanning speeds and amplitudes, it is sufficient if the user selects the corresponding scanning program; then the control and analyzer unit 8 reads the proper values out of the nonvolatile part of memory 28.

In step S14 which follows, the control and analyzer unit 8 also determines the number N of the frequency components to be used, which can be determined like the parameters of the scan program. The number N should advantageously be selected, so the frequency Nf is less than a predefined cut-off frequency, which may be selected as a function of the properties of the position regulating system 33 and the drive 30, for example. In addition, the number N should not be greater than a predefined maximum number, which is selected as a function of the desired scanning movement precision. The number N is preferably between 10 and 50 to yield the accuracy required for laser scanning microscopes.

In step S16, the control and analyzer unit 8 sets initial values for the parameters that are to be corrected; these parameters are used for control or regulation, i.e., the amplitudes $s_k$ and the phases $\phi_k$ for the frequency components for frequencies kf, where k=1, . . . , N. As mentioned above, the scan frequency f is the fundamental frequency, while the frequencies kf are the harmonic components, i.e., upper frequencies, for k>2. From the parameters to be corrected, it then determines the control signals using the optical transfer function as described above, and performing the predistortion. In the next step S18, these control signals are then delivered to the position regulating system 33 to obtain an image of the reference sample 2. The optical transfer function is saved at predefined interpolation points in a table in the nonvolatile part of the memory, where either the values used last or estimated values may be used. If values of the transfer function at the required frequencies have not been saved, they may be obtained by interpolation.

In step S18, by periodic scanning of the reference sample 2 according to the calculated control signals at least in x-direction, an image of the reference sample 2, i.e., an image of at least one section of the reference sample 2, is obtained. The reference sample 2 is oriented so that the grid lines are in first approximation orthogonal to the x-direction. The scan amplitude is selected as a function of the distance between the lines and the number N of frequency components, so at least as many grid lines are obtained as frequency components are used. The image is then saved, as described above, in the control and analysis device 8 in the memory 28. The image may then be recorded as usual with y deflection between the x lines, but it may also be recorded without this.

A detail from the reference sample 2 and from the image obtained is shown in FIG. 7. The lines 36 on the reference sample 2 are not obtained at the correct locations. Instead, the lines are obtained during the forward movement along the coarsely dotted lines 37 and during the reverse movement on the finely dotted lines 38, resulting in deviations Δs in the positions.

To be able to determine the deviations quantitatively, the target positions of the structures, i.e., grid lines in the image obtained, are determined first. This does not require positioning the sample with extremely high precision on the microscope stage.

In step S20, the actual position of at least one first structure of the reference sample is therefore determined from the image, namely in the example of the line determined as the center of the scan line i.e., the center of the effective area, during the forward movement in the image, i.e., the next one to be determined. The actual position of a line in the image closest to the line ascertained in the forward movement is then determined during the reverse movement. Next, the average of the actual positions thus ascertained in the forward and reverse movements is calculated and saved as the calculated target position of the line.

In step S22, the target positions of the remaining lines of the reference sample 2 are detected in the image and saved, starting from the actual position of the middle line using the known spacing of the structures and/or lines from one another.

In step S24, the actual positions of the remaining lines and their deviations from the target positions are then determined separately for the back-and-forth movements. Therefore, using known methods, the actual positions of the structures and/or lines in the image are ascertained first. In this process, the actual positions are allocated to pixels, i.e., their numbers and the back-and-forth movements. Then the deviation Δs between the target position and the actual position is calculated for the lines and saved. Deviations are depicted in FIG. 8a for the forward movement and FIG. 8b for the reverse movement as a function of pixel number p as an example. To facilitate an understanding of the following steps as well, the times when the values were obtained are also indicated below the pixels. The position of the line can be determined with accuracy in the sub-pixel range by interpolation of the intensity variations.

In step S26, a deviation function representing the deviations Δs as a function of time t during the movement and not as a function of pixel number p is then determined. Such a function, which is represented only by the values at the time of acquisition, is represented partially and as an example in FIG. 9. The deviation values thereby obtained and assigned to the pixels are rearranged so that they are arranged in order of their acquisition time. The values in the five different periods of the test movement are handled differently here:

No deviations are determined in the time between 0 and $t_1$, when the drive 32 and the mirror 33 are accelerated from a standstill at the reversal point and/or at the first end position of the movement to the desired scanning speed. Therefore, it is not necessary to obtain any pixels for this period of time.

In the forward movement between the times $t_1$ and $t_2$, the scanner 14 moves the focus 17 at a speed that is at least approximately constant, depending on the quality of the recent calibration, with the intensity values and/or energy values being determined at constant time intervals. These values are assigned sequentially to pixels with increasing ordinal numbers for the y-direction. Therefore, the acquisition times $t_p$ are assigned as times to the pixels and/or the deviations. These are obtained from the ordinal number p of the pixel multiplied times the constant interval of time Δt between the acquisition of immediately successive intensity values with respect to the time $t_1$:

$$t_p = p\Delta t + t_1$$

Therefore, no rearrangement is required.

No deviations are determined between the times $t_2$ and $t_3$, i.e., the reversal time for braking to the second end position and acceleration from the second end position in the direction of the first end position, so here again, no intensities need be detected.

In the return movement between times $t_3$ and $t_4$, the scanner moves the focus 17 at a speed that is at least approximately constant, depending on the quality of the prevailing calibration, where the intensity and/or energy values are obtained at constant intervals. However, because of the reverse movement, these are assigned to pixels in chronological order with decreasing ordinal numbers for the y-direction. Therefore, the acquisition time $t_p$ is assigned to each pixel for the reverse movement, this acquisition time being obtained, for example, from the maximum number $p_{max}$ of pixels obtained, the ordinal number p of the respective pixel and the interval of time between the acquisition of the intensity for two successive pixels and time $t_3$ as follows:

$$t_p = (p_{max} - p)\Delta t + t_3$$

These times are assigned to the deviations for the pixels in the reverse movement, whereby they are rearranged according to the times $t_p$ by reversing their order.

Again, in the period of time between time $t_4$ and $t_5$ during which the drive 32 and the mirror 33 are decelerated in the first half of the reversing movement, finally reaching a speed of zero in the first end position, no deviation values are ascertained.

This step results in a function, i.e., a curve, for the deviations in the actual test movement from the target test movement, determined on the basis of a bidirectionally recorded image of the reference sample with known structures in relative positions to one another. The interpolation points at which the deviations, i.e., the values of the deviation function, are given are not equidistant here; instead, gaps caused by the reversal periods occur here.

In the following step S28, correction components for the frequency components of the target test movement are then determined. To do so, a cross-correlation of the deviation curve with a standardized harmonic function of the same frequency but variable phase is determined for the fundamental frequency and each of the harmonics, with the phase being varied to maximize the correlation. The test function $h_k(t, \varphi_k) = \cos(kft + \varphi_k)$ is used here as the harmonic function. Deviation values for $N_T$ points in time were determined, yielding correlation function $K(k, \varphi_k)$ to be used:

$$K(k, \varphi_k) = \frac{\sum_{n=1}^{N_T} \Delta s(t_n) h_k(t_n, \varphi_k)}{\sum_{n=1}^{N_T} h_k^2(t_n, \varphi_k)}.$$

This function will now be maximized for each used value k as a function of $\varphi_k$. The maximal values of the function thereby determined as well as the phases $\phi_{km}$ of maximal correlation are then saved for each used value k. The saved value of the correlation function corresponds precisely to the amplitude of the frequency component of the deviation function at the frequency kf which is also referred to below as the correction component.

In step S30, a check determines whether the absolute values of the correction components fall below a predefined limit value, which is selected as a function of the desired precision in the movement. To do so, in the example the correction component, i.e., the number $k_{max}$ for which the absolute value of the correction component, i.e., the absolute value of the correlation with the test function is maximal is determined first. Then there is a check determines whether this exceeds the limit value. If it does not exceed the limit value, the method is terminated because the desired precision has been achieved. The corrected amplitudes and phases of the frequency components of the target movement then constitute the result of the correction and are saved in step S33.

Otherwise, in step 32 the amplitude $s_{kmax}$ and phase $\phi_{kmax}$ of the frequency component $k_{max}$ of the control signals are corrected as a function of the phase and amplitude of the deviation thereby determined, so the measured deviation between the target value and the actual value is eliminated. The corrected amplitudes and phases are saved. A corrected predistorted amplitude and phase, which form the basis for generating the control signals, are then determined from the measured deviations in amplitude and phase of the frequency component, and the current amplitude and phase of the frequency component are determined using the unchanged transfer function as described above and are saved.

As an alternative to step S32, several frequency components may also be corrected simultaneously.

As a result, the control signals are predistorted, so that after conversion of these control signals into the scanning movement in the effective areas within the scope of the precision required for the correction, the mirror 32 is moved in these areas as precisely as specified by the predefined target movement. The iteration often converges very rapidly, i.e., the deviation curve reaches very low deviation amplitudes after only a few run-throughs.

In this method it may be sufficient to perform the correction only for the x movement which is rapid in comparison with the y movement. In particular in the case when freely preselected scan curves are to be run, operation is to be in accordance with them, however, corrections are advantageously performed for both scanning directions. Likewise in another embodiment, it is possible to use as the termination criterion for the iterative correction the fact that the standard deviation of the deviation curve falls below another predefined limit value.

A method according to a second preferred embodiment of the invention differs from the method of the first exemplary embodiment in that now the transfer function is corrected. The corresponding laser scanning microscope differs from that of the first exemplary embodiment only through the modified programming of the control and analyzer unit. Since a few steps of the method are the same as in the first exemplary embodiment, they are labeled here with the same reference numerals and the embodiments of these steps in the first exemplary embodiment are also applicable here accordingly.

This method is diagrammed schematically in the flow chart in FIG. 10. As was also the case in the first exemplary embodiment, it is assumed here that values of a transfer function are already available and have been saved. If no specific values for the scanner are known, then it may be assumed initially, for example, that the amplitude components $U_A$ assume a value of 1 for all frequencies in question and that the phase components $U_P$ assume a value of zero.

First the steps S10 through S26 of the method according to the first exemplary embodiment are performed to ascertain the deviation function using the last transfer function saved. This deviation function is saved as a reference deviation function. These steps are depicted as a block S34 in FIG. 10.

In step S36 the fundamental frequency is then selected as the test frequency and a parameter $k_{test}$ is set at a value of 1.

In step S38 a frequency component Z(t) with the test frequency $k_{testf}$ is added to the control signal, the amplitude $\delta s$ preferably being selected so that it is much smaller than the value of the amplitude $s_{ktest}$ but on the other hand a change in the deviation $\Delta s$ caused by this change can still be detectable with only a small error. The phase $\phi_z$ of the harmonic function added is preferably selected so that the resulting deviation curve is approximately symmetrical with the midpoint of the back-and-forth movement. This facilitates an analysis of the response to the change. Then steps S16 through S26 are again performed with the modified frequency components whereby a modified deviation function is obtained. These steps are represented by a block S40 in FIG. 10.

In step S42 the differential function of the deviation function ascertained in block S40 and the reference deviation function obtained in block S10 is then determined. The difference is the response of the scanner to the additional excitation, as described by the frequency component Z(t). Assuming a linear system, the response is in turn a harmonic function with the test frequency, but with an altered amplitude and phase in comparison with the frequency component of the target test movement.

Therefore, in step S44 the amplitude $A_m$ and the phase $P_m$ of the differential function and/or the response function are ascertained by adjustment with a harmonic function.

In step S46, the transfer function of the scanner is then corrected by altering the frequency component of the transfer function for the test frequency. To do so, the amplitude component $U_A$ and the phase component $U_P$ are ascertained on the basis of the amplitude and phase of the response curve, and the amplitude and phase are determined and saved instead of the values saved previously. In a variant of the exemplary embodiment, it is also conceivable for a sliding average to be formed and used over the values measured current and those stored last.

In step S48, the value $k_{test}$ is then increased by 1. If the resulting value is smaller than N, then the test frequency is set at the value $k_{testf}$ and the method is continued with step S38. Otherwise, the correction method is terminated.

In this way, the transfer function of the scanner is corrected over the entire frequency range used, so that deviations between the target movement and the actual movement of the focus 17 are reduced, namely minimized in the ideal case.

This method of determining the transfer function has advantages in particular when the transfer function depends on the amplitude.

Depending on the type of scanner used, the amplitude of the target test movement need not be taken into account in other exemplary embodiments because the deviations are in good approximation independent of the amplitude.

In other exemplary embodiments, the transfer function may be given in a parameterized function. For example a representation as a spline function may be used, in which case the spline coefficients are then saved in memory 28 and the computer program contains instructions for the determining the values of the transfer function.

The transfer function corrected with the method according to this invention may be used for ascertaining a correction of the check-back signal of the capacitive position sensor 32. The check-back signals delivered by the sensor indicate only the position of the drive but not the position of the focus 17. In addition with digital processing of the check-back signals, an analog-digital conversion may be necessary, which in turn causes a deviation. The corresponding analog-digital converter is then preferably assigned to the sensor and then the digitized signals are interpreted as the check-back signals. Furthermore the check-back signals and/or position signals of the position sensor 32 are transmitted electronically and are distorted in the process. If the check-back signals are used for representing the actual movement of the focus 17 on the display device 9, then under some circumstances, an observer will detect a deviation due to the differences between the optical transfer function and the electric transfer function that reflect the correlation between the control signals corresponding to the target movement and the actual movement of the drive 32 described by the check-back signals thereby transmitted. This can be avoided if the check-back signals are corrected.

For display of the actual movement in an investigation, the check-back function $R_x(t)$ is recorded.

Then, in a next step, a Fourier transform is performed on the check-back function at which the Fourier amplitude and phase $Am(R_x, kf)$ and $Ph(R_x, kf)$ are determined using known equations.

The corrected Fourier amplitude is obtained as follows when the electric transfer function is assumed to be known with components $U_{A,electric}$ and $U_{P,electric}$:

$$Am_{corr}(kf) = \frac{U_{A,optical}(kf)}{U_{A,electric}(kf)} Am(kf)$$

and the corrected phase:

$$Ph_{corr}(kf) = U_{P,optical}(kf) - U_{P,electric}(kf) + Ph(kf).$$

Therefore the quotient $U_{A,optical}/U_{A,electric}$ and the different $U_{P,optical}/U_{P,electric}$ are saved as the correction function of the frequency kf so that the two equations given above can easily be used with any measurement.

In the case of a retransformation of the corrected frequency components of the check-back signal, a corrected check-back signal that reflects the actual movement of the focus 17 is obtained. An observer can therefore easily monitor whether the target movement he has requested has in fact been performed.

The check-back signals thus corrected may also be used for calibration purposes, for example, if wear on the scanner is to be compensated by purely electrical calibration. Another preferred embodiment of the invention differs from the first exemplary embodiment in that the reference sample 2 is connected fixedly to the laser scanning microscope by being integrated into the specimen stage.

Yet another preferred embodiment of the invention differs from the first exemplary embodiment in that the laser scanning microscope has a reference sample 2' which is fixedly connected to the laser scanning microscope, a reference optics 40 for imaging the reference sample 2' on the acquisition device 7 and a beam deflecting element 42, namely in this example a mirror, that is arranged in the illumination and imaging beam path by a drive 41 between the deflecting section 5 and the microscope 6. All the other parts are unchanged so that the same reference numerals are used for them and the explanations of the first exemplary embodiment are also applicable here.

By performing the method, the beam deflecting element 42 is moved into the illumination and imaging beam path so that the beam path section moved by the deflection section 5 can be directed at the reference optics 40 and the reference sample 2'. The method is then performed as in the first exemplary embodiment, whereby optical properties of the reference optics 40 that deviate from the properties of the microscope optics 6 are optionally also taken into account.

The invention claimed is:

1. A laser scanning microscope with correctable scanning control, comprising:
    an illumination device (10) for illuminating a reference sample (2; 2') having at least two imageable, predefined structures therein, illumination from the illumination device defining an illumination beam path from the illumination device to the reference sample,
    detection means (7) for obtaining at least parts of an image of the reference sample (2; 2') by detecting detection radiation from the reference sample (2; 2') propagating along an imaging beam path from the reference sample (2; 2') to the detection means (7), and for outputting detection signals,
    an optical scanner (14) arranged in at least one of the illumination beam path and the imaging beam path, the scanner having at a transfer function, and the scanner having at least one parameter used for at least one of control and regulation thereof, the scanner comprising:
        beam deflecting means for guiding a beam path section of at least one of the illumination beam path and the imaging beam path, and
        controller means (8) having an input for detecting signals output by the at least one detection means (7), the controller means generating control signals corresponding to a predefined target test movement, determining from an image of the reference sample (2; 2') obtained from the detection means (7) deviations of the actual positions of the predefined structures (36) from predefined target positions, and correcting at least one of the at least one parameter and the transfer function as a function of the deviations to reduce a deviation in the actual position of at least one of the structures (36) from the target position, and
        a drive for driving the beam deflecting means in response to the control signals generated by the controller means.

2. The microscope according to claim 1, wherein the controller means (8) generates control signals to move the target test movement in a forward direction from a predefined first end position to a predefined second end position and in a backward direction from the second end position along at least one section of the path of the forward movement.

3. The microscope according to claim 2, wherein the detection means detects image data only in an effective range which is less than twice a predefined amplitude of the target test movement.

4. The microscope according to claim 2, wherein for determining the target positions of at least two of the predefined structures (36), the controller means (8) determines the actual positions of at least one of the predefined structures (36) of the reference sample (2; 2') during the back-and-forth movement, and determines the target positions of at least two of the predefined structures (36) by using the actual positions and predefined relative positions of the predefined structures (36) of the reference sample (2; 2').

5. The microscope according to claim 2, wherein the controller means (8) generates control signals so that:
the target test movement is a uniform, linear movement in at least some sections in the detection range,
the intensities are determined at constant time intervals in both the forward and backward movements and assigned to pixels corresponding to locations on the reference sample (2; 2'),
to determine the deviations, the deviations for pixels with the same location along the target movement path are determined in both the forward and backward direction and the deviations are determined pixel by pixel and separately for the forward and backward movements, and
to determine the deviations as a function of time, the deviations assigned to the pixels are reversed in their order for one of the back-and-forth movements and placed before or after a string of deviations assigned to the pixels for the other back-and-forth movement.

6. The microscope according to claim 1, wherein the controller means (8) defines target test movement by superimposing of frequency components, and in order to determine at least one of the frequency components of the actual movement, determines a cross-correlation of the actual movement or the determined deviations with a harmonic function corresponding to the frequency component.

7. The microscope according to claim 6, wherein the controller means (8) corrects at least one of frequency component amplitudes and phases as parameters used for control, which before the correction, represent the predefined target test movement in the superimposition.

8. The microscope according to claim 1, wherein to correct the transfer function, the controller means (8) predefines the target test movement by frequency components describing the target test movement, forms the control signals by superimposing the frequency components after the deviations are determined, modifies at least one of the frequency components, and forms modified control signals by superimposing the resulting frequency components,
to detect another image of the reference sample (2; 2') with the detection means, the controller means (8) generates control signals corresponding to a predefined target test movement and in response to the control signals, the drive means drives the beam deflection means to move at least one beam path section (4', 18'),
from the additional obtained image, the controller means (8) determines additional deviations of the actual positions of the predefined structures (36) of the reference sample (2; 2') from predefined target positions, and
the controller means (8) determines a value of the transfer function the deviations and the additional deviations and the change in the frequency component.

9. The microscope according to claim 1, wherein the reference sample (2; 2') is connected fixedly to the microscope.

10. The microscope according to claim 9, further comprising reference optics (40) for imaging the reference sample (2; 2') on the detection means (7).

11. The microscope according to claim 1, further comprising position sensor means (32) for detecting at least one of the position of the drive (30) and the beam deflecting means (31) and generating a position signal representing the position.

12. A method for correcting control of the optical scanner (14) of the microscope of claim 1, comprising the steps of:
generating control signals corresponding to a predefined target test movement, using the controller means,
in response to the control signals, moving at least one beam path section (4', 18') in a predefined target test movement using the beam deflecting means,
detecting an image of the reference sample (2; 2') having predefined structures (36) by moving the at least one beam path section 4', 18'),
determining from the detected image of the reference sample respective deviations in the actual positions of the predefined structures (36) from the predefined target positions, and
correcting one of the at least one parameter and the transfer function as a function of the deviations, so that when the corrected parameter or the corrected transfer function is used, the deviation in the actual position of at least one of the structures (36) from the target position of the structure is reduced.

13. The method according to claim 12, wherein in the step of moving at least one beam path section (4', 18') in a predefined target test movement, the target test movement is carried out in a forward direction from a predefined first end position to a predefined second end position, and is carried out in a backward direction from the second end position along at least one section of the path of the forward direction.

14. The method according to claim 13, wherein in the step of detecting an image of the reference sample (2; 2'), image data are detected only in an effective range which is less than twice a predefined amplitude of the target test movement.

15. The method according to claim 13, further comprising the steps of:
determining the actual positions of at least one of the predefined structures (36) of the reference sample (2; 2') in the back-and-forth movement, and
using the actual positions of at least one of the predefined structures (36) of the reference sample (2; 2') and predefined relative positions of the predefined structures (36) of the reference sample (2; 2') to determine the target positions of at least two of the predefined structures (36).

16. The method according to claim 14, further comprising the steps of:
determining the actual positions of at least one of the predefined structures (36) of the reference sample (2; 2') in the back-and-forth movement, and
using the actual positions of at least one of the predefined structures (36) of the reference sample (2; 2') and predefined relative positions of the predefined structures (36) of the reference sample (2; 2') to determine the target positions of at least two of the predefined structures (36).

17. The method according to claim 15, wherein in the step of moving at least one beam path section (4', 18') in a predefined target test movement, the target test movement is uniform and linear in at least some sections in the detection range, the intensities are determined at constant time intervals in both the forward and backward movements and assigned to pixels corresponding to locations on the reference sample (2; 2'), for determining the deviations, the deviations are determined for pixels with the same location along the target movement path in both the forward and backward direction, and the deviations are determined pixel by pixel and separately for the forward and backward movements, and to determine the deviations as a function of time, the deviations assigned to the pixels are reversed in their order for one of the back-and-forth movements and placed before or after a string of deviations assigned to the pixels for the other back-and-forth movement.

18. The method according to claim 13, wherein in the step of using the controller means to generate control signals corresponding to a predefined target test movement, the target test movement is defined by superimposing of frequency components, and a cross-correlation of the actual movement or the determined deviations with a harmonic function corresponding to the frequency component is determined to determine at least one of the frequency components of the actual movement.

19. The method according to claim 18, wherein at least one of amplitudes and phases of frequency components as parameters used for control are corrected, which represent the predefined target test movement in the superimposition before the correction.

20. The method according to claim 12, wherein in the correcting step, to correct the transfer function, the target test movement is predefined by frequency components describing the target test movement, and wherein in the generating step, the control signals are generated by superimposing of the frequency components, the method comprising the further steps of:
modifying at least one of the frequency components after the step of determining the deviations, and
generating modified control signals by superimposing of the modified frequency components,
acquiring another image of the reference sample (2; 2') by generating control signals corresponding to a predefined target test movement and by moving at least one beam path section (4', 18') in response to the control signals,
determining additional deviations in the actual positions of the predefined structures (36) of the reference sample (2; 2') from predefined target positions from the additional obtained image, and
determining a value of the transfer function from the deviations and the additional deviations and the change in the frequency component.

21. The method according to claims 12, wherein the microscope further comprises reference optics for imaging the reference sample (2; 2') on the detection means (7), the reference sample (2; 2') being fixedly connected to the microscope and, and wherein the method further comprises the step of deflecting at least one portion of the moving beam path section (4', 18') onto the reference optics for imaging the reference sample (2; 2') on the detection means (7), to detect the image of the reference sample (2; 2').

22. A method for correcting feedback signals of the position sensor (32) of the microscope of claim 11, comprising the steps of:
using the drive to drive the beam deflecting means of the optical scanner (14) to deflect a beam path section of the microscope in a controlled manner,
detecting the position of at least one of the drive and the beam deflecting means and generating a position signal representing the position, using the position sensor means (32), and
correcting the position signal to reproduce the actual movement of the beam path section (4', 18') moved by the scanner (14).

23. The method according to claim 22, wherein the step of correcting the position signal is carried out using a corrected parameter used for controlling or regulating the scanner (14) and determined by a method comprising the steps of:
generating control signals corresponding to a predefined target test movement, using the controller means,
in response to the control signals, moving at least one beam path section (4', 18') in a predefined target test movement using the beam deflecting means,
detecting an image of the reference sample (2; 2') having predefined structures (36) by moving the at least one beam path section 4', 18'),
determining from the detected image of the reference sample respective deviations in the actual positions of the predefined structures (36) from the predefined target positions, and
correcting one of the at least one parameter and the transfer function as a function of the deviations, so that when the corrected parameter or the corrected transfer function is used, the deviation in the actual position of at least one of the structures (36) from the target position of the structure is reduced.

* * * * *

UNITED STATES PATENT AND TRADEMARK OFFICE
CERTIFICATE OF CORRECTION

| | | |
|---|---|---|
| PATENT NO. | : 7,679,045 B2 | Page 1 of 1 |
| APPLICATION NO. | : 11/525210 | |
| DATED | : March 16, 2010 | |
| INVENTOR(S) | : Joerg Steinert | |

It is certified that error appears in the above-identified patent and that said Letters Patent is hereby corrected as shown below:

Title page, item [73] assignee, change "Microimaging"

to --MicroImaging--

Signed and Sealed this
Twenty-eighth Day of December, 2010

David J. Kappos
*Director of the United States Patent and Trademark Office*